(12) United States Patent
Chalin et al.

(10) Patent No.: US 7,007,960 B2
(45) Date of Patent: Mar. 7, 2006

(54) SUSPENSION SYSTEM HAVING REDUCED STRESS AXLE CONNECTION

(75) Inventors: Thomas N. Chalin, Fairview, TX (US); Donald R. Watson, Fairview, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 392 days.

(21) Appl. No.: 10/061,774

(22) Filed: Feb. 1, 2002

(65) Prior Publication Data

US 2003/0146592 A1 Aug. 7, 2003

(51) Int. Cl.
*B60G 9/02* (2006.01)
(52) U.S. Cl. .............................................. 280/124.116
(58) Field of Classification Search ......... 280/124.116, 280/124.11, 124.128, FOR. 128, FOR. 134, 280/FOR. 184
See application file for complete search history.

(56) References Cited

U.S. PATENT DOCUMENTS

| | | | |
|---|---|---|---|
| 4,166,640 A | 9/1979 | Van Denberg | |
| 4,693,486 A | 9/1987 | Pierce et al. | |
| 5,366,237 A | 11/1994 | Dilling et al. | |
| 5,375,871 A | 12/1994 | Mitchell et al. | |
| 5,634,655 A | 6/1997 | Chalin | |
| 6,039,336 A | 3/2000 | Frey | |
| 6,241,266 B1 | 6/2001 | Smith et al. | |
| 6,491,314 B1 * | 12/2002 | Smith et al. | 280/124.116 |
| 2001/0017451 A1 | 8/2001 | Smith et al. | |
| 2001/0020775 A1 * | 9/2001 | Pierce et al. | 280/124.128 |

FOREIGN PATENT DOCUMENTS

| | | |
|---|---|---|
| EP | 0 240 649 A | 10/1987 |
| EP | 0 863 060 A | 9/1998 |

* cited by examiner

*Primary Examiner*—Eric Culbreth
(74) *Attorney, Agent, or Firm*—Konneker & Smith, P.C.

(57) ABSTRACT

A vehicle suspension system includes features which reduce stress in an axle connection. In a described embodiment, a vehicle suspension system includes a sleeve which is clamped on an axle. The sleeve is retained in its clamped position and is welded to opposing side walls of an arm. A bottom plate of the arm may also be welded to the sleeve.

69 Claims, 9 Drawing Sheets

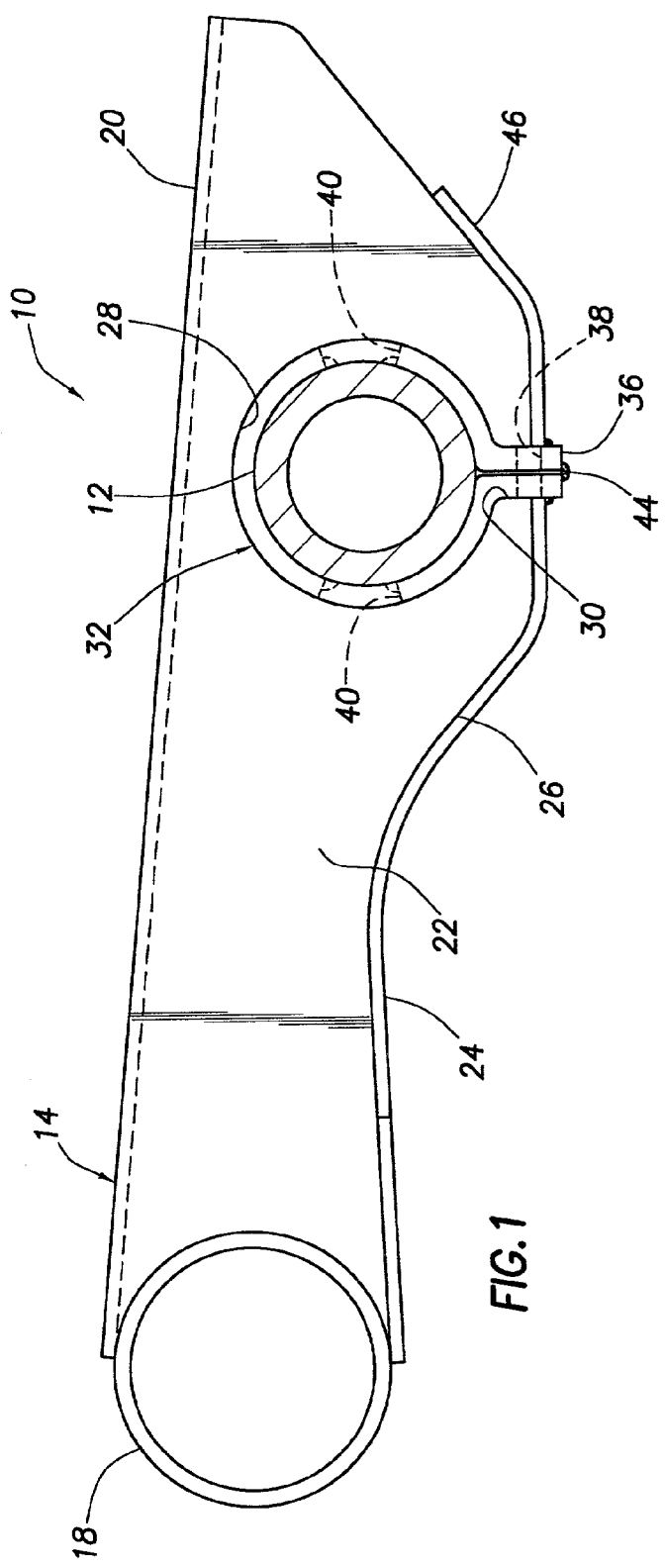
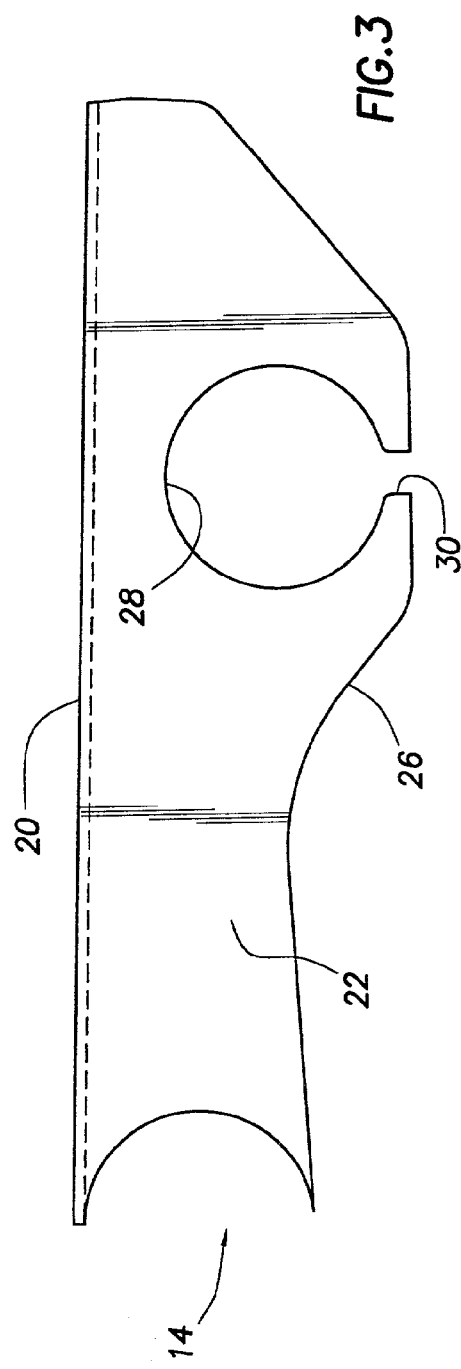
FIG.1
FIG.3

SUSPENSION SYSTEM HAVING REDUCED STRESS AXLE CONNECTION

BACKGROUND

The present invention relates generally to vehicle suspension systems and, in an embodiment described herein, more particularly provides a suspension system having a reduced stress axle connection.

It is well known in the suspension system art to weld an arm to an axle of the suspension system. Due to the requirements of manufacturing tolerances and economy, typically some clearance is provided between the axle and the arm. Unfortunately, this clearance between the axle and arm leads to relatively weak welds, for example, having reduced fatigue strength. This clearance between the axle and arm also increases the stress in the welds, leading to premature failure of the welds.

It has been proposed to reinforce the axle by means of a sleeve interposed between the axle and arm. In one such proposal, the sleeve is press-fitted on the axle to reduce the clearance therebetween, but this adds steps to the manufacturing process, requires additional special equipment, requires exceptionally close machining tolerances, etc. In another such proposal, the sleeve is made in multiple segments which are assembled about the axle prior to being welded to the axle, but this complicates the manufacturing process and also requires additional special equipment and steps to assemble the sleeve segments about the axle, without resolving the problem of clearance between the axle and the member(s) welded thereto.

From the foregoing, it can be seen that it would be quite desirable to provide a suspension system and associated manufacturing process which reduce the stress in an axle connection by removing the clearance between the axle and a sleeve welded to the axle. Such a suspension system and manufacturing process would preferably also provide for welding an arm to an axle without welds being positioned in high stress areas.

SUMMARY

In carrying out the principles of the present invention, in accordance with an embodiment thereof, a suspension system is provided which includes a sleeve welded to an axle and an arm of the suspension system. Methods of fabricating the suspension system are also provided.

In one aspect of the invention, a vehicle suspension system is provided which includes an axle, a sleeve and an arm. The sleeve is clamped on the axle without press-fitting, and the sleeve is welded in its clamped position. The axle may also be welded to the sleeve in its clamped position. The arm is attached to the axle by welding the arm directly to the sleeve.

In another aspect of the invention, the arm has opposing side walls. Each of the side walls has an opening formed therethrough. The sleeve is received in each of the openings, and the sleeve is welded to the arm less than 360 degrees about a periphery of each of the openings.

In yet another aspect of the invention, a method of fabricating a vehicle suspension system is provided. The method includes the steps of clamping a sleeve to an axle without press-fitting; welding the sleeve, thereby retaining the sleeve in its clamped position; and welding the sleeve to each of opposing side walls of an arm, the sleeve being welded less than 360 degrees about an opening formed through each of the side walls.

In a further aspect of the invention, the step of clamping the sleeve to the axle removes clearance between the sleeve and axle, and applies a compressive stress between the sleeve and axle. The clamping step may be performed by tightening a fastener in a clamp portion of the sleeve. The compressive stress between the sleeve and axle may be retained by welding members of the sleeve clamp portion to each other.

These and other features, advantages, benefits and objects of the present invention will become apparent to one of ordinary skill in the art upon careful consideration of the detailed description of representative embodiments of the invention hereinbelow and the accompanying drawings.

BRIEF DESCRIPTION OF THE DRAWINGS

FIG. 1 is a side view of a suspension system embodying principles of the present invention;

FIG. 3 is a side view of an arm subassembly of the suspension system of FIG. 1;

DETAILED DESCRIPTION

Figure 2:
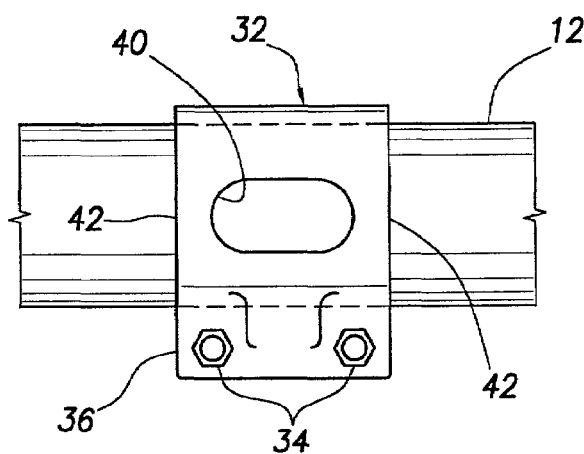
FIG. 2 is a front elevational view of an axle/clamp subassembly of the suspension system of FIG. 1.

Representatively illustrated in FIG. 1 is a portion of a vehicle suspension system 10 which embodies principles of the present invention. In the following description of the suspension system 10 and other apparatus and methods described herein, directional terms, such as "above", "below", "upper", "lower", "top", "bottom", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The suspension system 10 includes an axle 12 attached to two trailing arms 14. Only one of the arms 14 is visible in FIG. 1. The suspension system 10 is of the type which has two trailing arms 14 pivotably attached at their forward ends to opposite lateral sides of a vehicle frame 16 (see FIG. 6), and attached at or near their rearward ends to the axle 12. It is to be clearly understood, however, that principles of the invention may be incorporated into other types of suspension systems having any number of arms.

The arm 14 includes a bushing sleeve 18 at its forward end for receiving a pivot bushing of the type well known to those skilled in the art. Extending rearwardly from the bushing sleeve 18 are four outer sides of the arm 14, the four sides including a top plate 20, two opposing side walls 22 (only one of which is visible in FIG. 1), and a bottom plate 24. The top plate 20 and side walls 22 are preferably formed from a single metal sheet which is bent so that it has a generally U-shaped cross-section.

The bottom plate 24 extends laterally between the side walls 22 and is welded to the side walls along a lower peripheral edge 26 of each side wall. The bottom plate 24, top plate 20 and side walls 22 are also welded at their forward ends to the bushing sleeve 18. Of course, the arm 14 could be otherwise constructed without departing from the principles of the invention.

The axle 12 extends through a circular opening 28 formed through each side wall 22. Note that the opening 28 does not completely encircle the axle 12, however, since there is a void 30 extending between the opening 28 and the edge 26. These features of the arm 14 may be more clearly seen in FIG. 3, wherein the arm is illustrated prior to its attachment to the axle 12, bushing sleeve 18 and bottom plate 24.

In a unique aspect of the invention, the arm 14 is attached to the axle 12 using a sleeve 32 which is clamped to the axle. This clamping of the sleeve 32 to the axle 12 applies a compressive stress between the sleeve and axle, and removes clearance between the axle and sleeve. As a result, when the sleeve 32 is later welded to the axle 12, the welds are much stronger and have an increased fatigue strength.

Note that this result is obtained without the added expense of precise machining tolerances and specialized equipment required for press-fitting a sleeve onto an axle. The heating and/or cooling equipment and processes required for shrink-fitting are also not required.

Instead, the sleeve 32 of the suspension system 10 is clamped onto the axle 12 using fasteners 34, such as bolts, fasteners of the type available from Huck Industrial Fastener Division, a division of Alcoa Corporation, or any other type of fasteners, in a clamp portion 36 of the sleeve. The fasteners 34 may be seen in FIG. 2, wherein a front view of the sleeve 32 and axle 12 is illustrated prior to the arm 14 being attached thereto. The fasteners 34 pass through holes 38 formed through the clamp portion 36.

In a preferred method of fabricating the suspension system 10, the sleeve 32 is positioned on the axle 12 and the fasteners 34 are tightened in the clamp portion 36 to remove clearance between the sleeve and axle. The sleeve 32 is then welded to the axle 12. Preferably, the sleeve 32 is first welded to the axle 12 about openings 40 formed through the sleeve.

The openings 40 are centered on opposite vertical sides of the sleeve 32. In this manner, the sleeve 32 is welded to the axle 12 in a low stress area of the axle and reduces the effects of stress concentrations in the axle due to the welding. This combination of higher strength welds (due to removal of clearance between the sleeve 32 and the axle 12) and positioning of welds in low stress areas of the axle provides increased strength in the axle and in the sleeve-to-axle connection.

Note, however, that the sleeve 32 may also be welded to the axle 12 at opposite lateral ends 42 of the sleeve, for example, either partially or completely encircling the axle. Alternatively, if the clamping of the sleeve 32 onto the axle 12 produces a sufficient bearing load therebetween, no welding of the sleeve to the axle may be required.

After the sleeve 32 is welded to the axle 12, the sleeve is inserted into the openings 28 in the arm 14, and the arm is welded to the sleeve about the openings. Note that the clamp portion 36 is received in the voids 30 when the sleeve 32 is inserted into the openings 28. To permit the clamp portion 36 to be received in the voids 30, the fasteners 34 may be removed from the clamp portion prior to inserting the sleeve 32. Other embodiments are described below in which it is not necessary to remove the fasteners 34 prior to inserting the sleeve 32 into the openings 28. Thus, it may be seen that the fabrication method of the present invention is not dependent upon any particular order of steps.

For increased strength in the axle 12 to arm 14 connection, the clamp portion 36 may be welded together, thereby retaining the compressive stress between the sleeve 32 and axle. In FIG. 1, a weld 44 is shown between two members of the clamp portion 36 extending outwardly from the void 30. It is not necessary, however, for the clamp portion 36 to be welded together in keeping with the principles of the invention.

The bottom plate 24 of the arm 14 is also preferably welded to the clamp portion 36 of the sleeve 32. Another bottom plate 46 extending between and attached to the side walls 22 may also be welded to the clamp portion 36. Note that the bottom plates 24, 46 may be welded to the side walls 22 along the edges 26 prior to inserting the sleeve 32 into the openings 28, or the bottom plates may be welded to the side walls and to the sleeve 32 after the sleeve is inserted into the openings.

For increased strength, the sleeve 32 substantially encircles the axle 12, extending substantially greater than 180 degrees about the axle. The openings 28 extend less than 360 degrees about the sleeve 32, and so the side walls 22 are welded less than 360 degrees about the sleeve. The edges of the void 30 may be welded to the clamp portion 36 to further strengthen the attachment between the sleeve 32 and arm 14.

Figure 4:
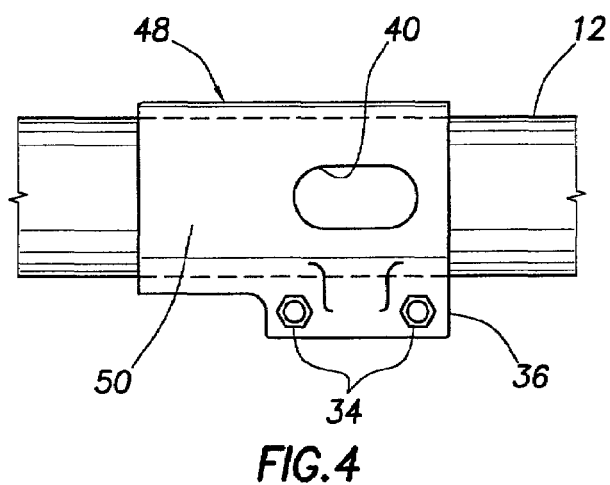
FIG. 4 is a front elevational view of an alternate axle/clamp subassembly of the suspension system of FIG. 1.
Figure 5:
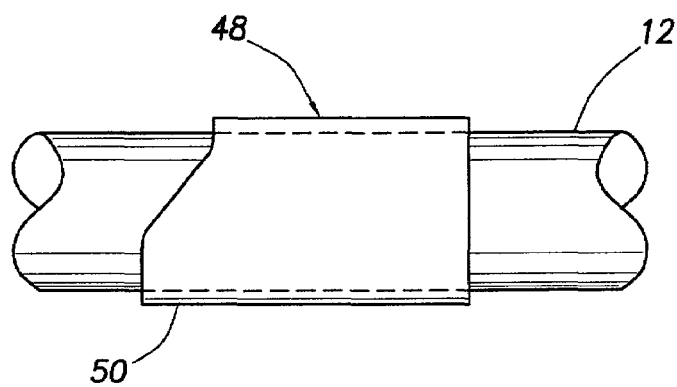
FIG. 5 is a top view of the alternate axle/clamp subassembly of FIG. 4.

Referring additionally now to FIGS. 4 & 5, an alternate sleeve 48 is representatively illustrated attached to the axle 12. The alternate sleeve 48 differs from the sleeve 32 described above in that it includes a laterally extending portion 50. Thus, the alternate sleeve 48 is substantially wider than the sleeve 32.

The portion 50 supplies a convenient location for mounting additional equipment, such as a shock absorber, to the sleeve 48. In this manner, the equipment may be rigidly attached to the axle 12 via the sleeve 48, without the necessity of also, or alternatively, attaching the equipment to the arm 14. This saves weight, enhances the efficiency of the manufacturing process and reduces stress in the arm 14 (as opposed to attaching such equipment to the arm, which typically requires substantial reinforcement of the arm).

Figure 6:
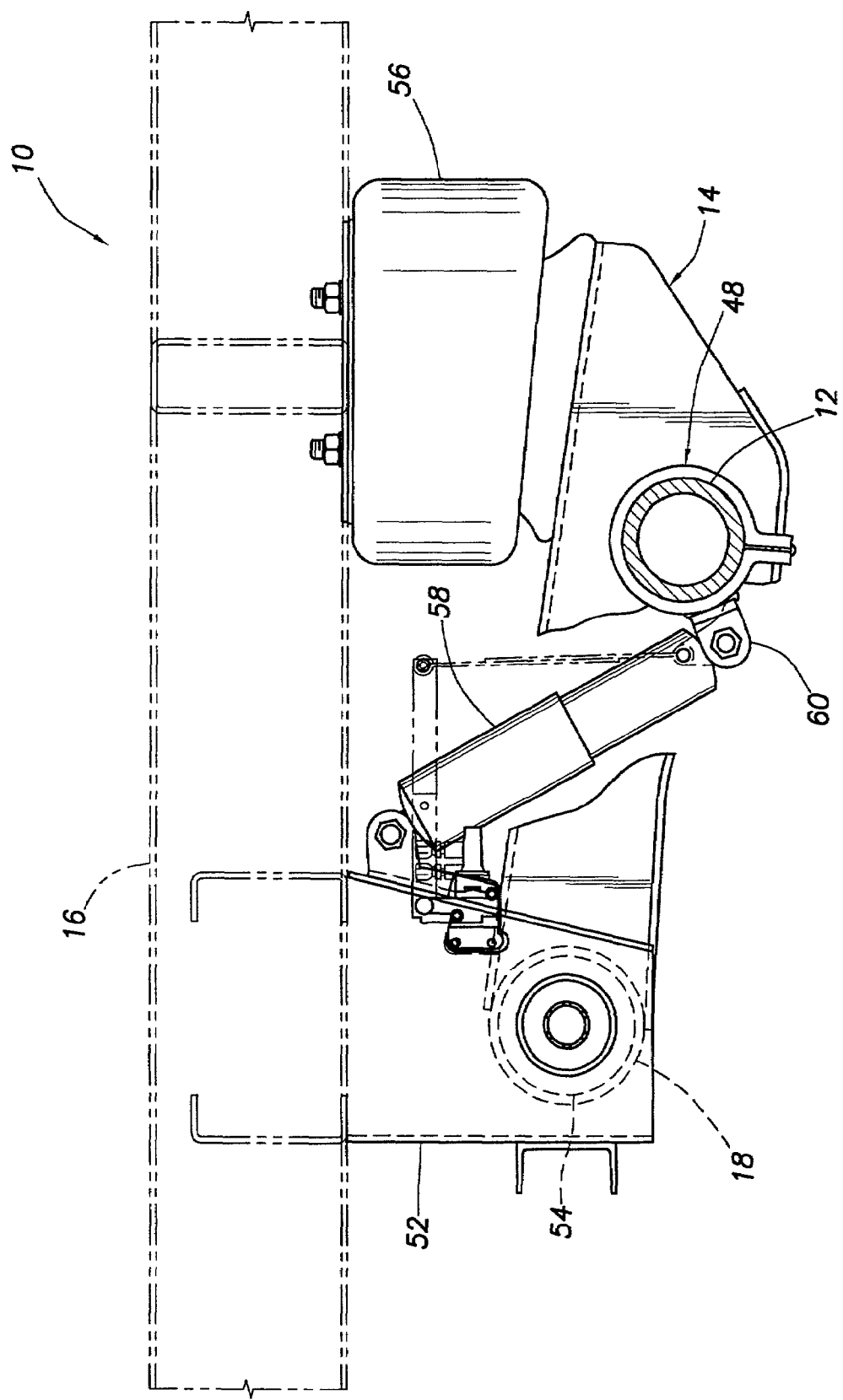
FIG. 6 is a side view of the suspension system of FIG. 1 incorporating the alternate axle/clamp subassembly of FIG. 4.

Referring additionally now to FIG. 6, the suspension system 10 is representatively illustrated with the alternate sleeve 48 incorporated therein. The arm 14 is pivotably attached to a hanger bracket 52 extending downwardly from the vehicle frame 16. A bushing 54 is received in the bushing sleeve 18, thereby permitting the arm 14 to rotate and articulate somewhat relative to the hanger bracket 52. An air spring 56 is positioned between the frame 16 and a rear portion of the arm 14.

A shock absorber 58 is interconnected between the hanger bracket 52 and the sleeve 48. For this purpose, a mounting bracket 60 is welded to the portion 50 of the sleeve 48. Thus, it may be seen that the invention provides a convenient attachment of the shock absorber 58 to the axle 12, without requiring the shock absorber to be mounted to the arm 14.

Figure 7:
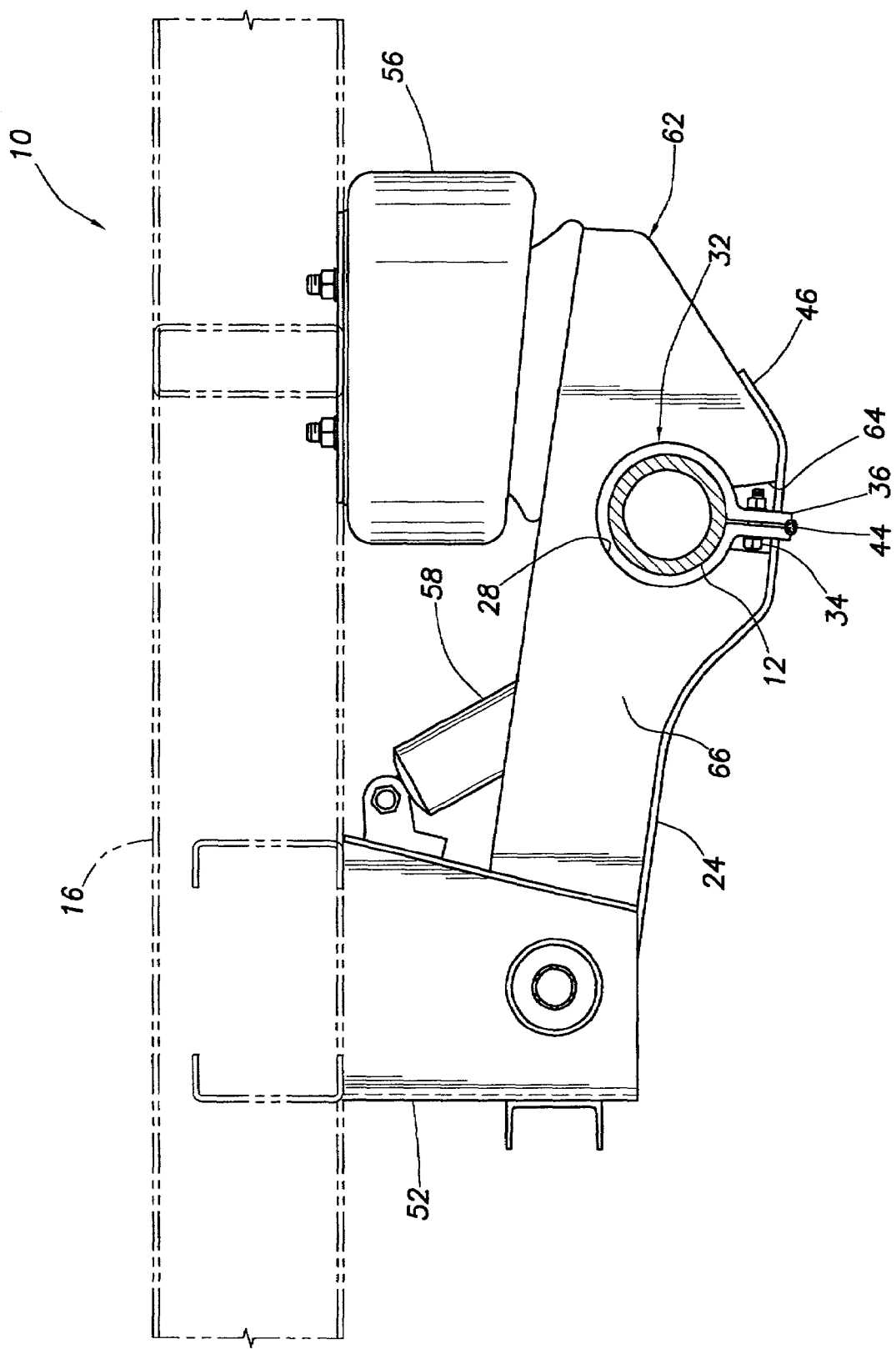
FIG. 7 is a side view of a second suspension system embodying principles of the present invention.

Referring additionally now to FIG. 7, the suspension system 10 is representatively illustrated with an alternate arm 62 incorporated therein in place of the arm 14 described above. The arm 62 is very similar to the arm 14, but differs in at least one respect in that it includes a void 64 in at least one of its side walls 66 which is configured to permit the fasteners 34 to pass therethrough.

In this manner, it is not necessary for the fasteners 34 to be removed from the clamp portion 36 prior to inserting the sleeve 32 into the openings 28. Of course, other means of permitting the fasteners 34 to pass through the side walls 66 may be used without departing from the principles of the invention. For example, the fasteners 34 could be recessed into the clamp portion 36, etc.

The clamp portion 36 may still be welded together, for example, by the weld 44, even though the fasteners 34 are not removed from the clamp portion. In addition, the bottom plates 24, 46 may still be welded to the clamp portion 36.

Figure 8:
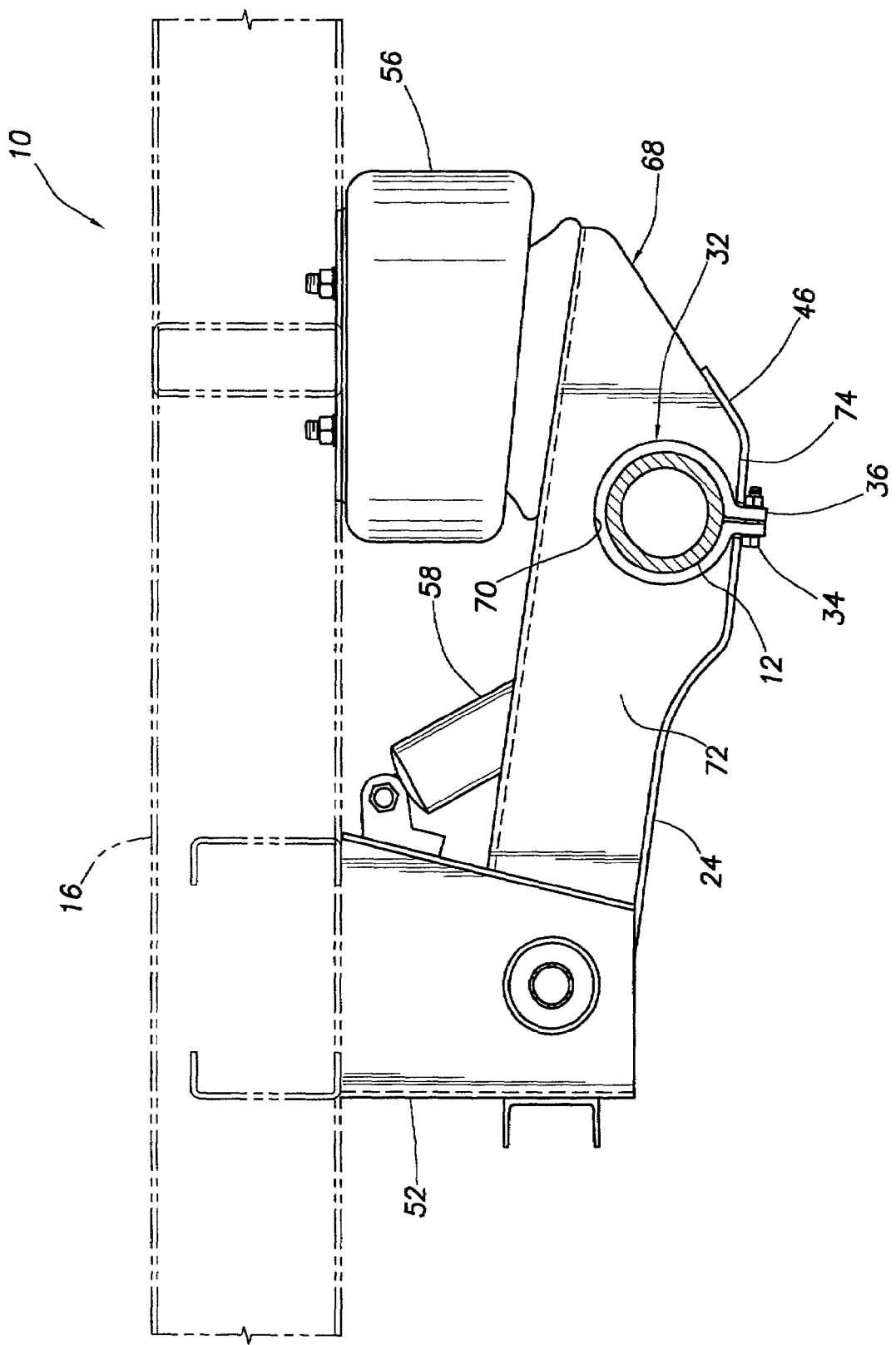
FIG. 8 is a side view of a third suspension system embodying principles of the present invention.

Referring additionally now to FIG. 8, the suspension system 10 is representatively illustrated with another alternately constructed arm 68. The arm 68 is very similar to the arm 14, but differs in one respect in that it has openings 70 in each of its side walls 72 which intersect, or are open at, lower peripheral edges 74 of the side walls. Thus, there are no separate voids 30 extending between the openings 70 and the peripheral edges 74, but the voids may instead be considered part of the openings.

The openings 70 are closer to the lower edges 74, so that when the sleeve 32 is inserted into the openings, the fasteners 34 are below the side walls 72. This is another means by which it is not necessary for the fasteners 34 to be removed from the clamp portion 36 prior to inserting the sleeve 32 into the openings 70. This may also permit the bottom plates 24, 46 to be welded to the sleeve 32 above the clamp portion 36. The clamp portion 36 may also be welded together as described above, whether or not the fasteners 34 are removed.

Figure 9:
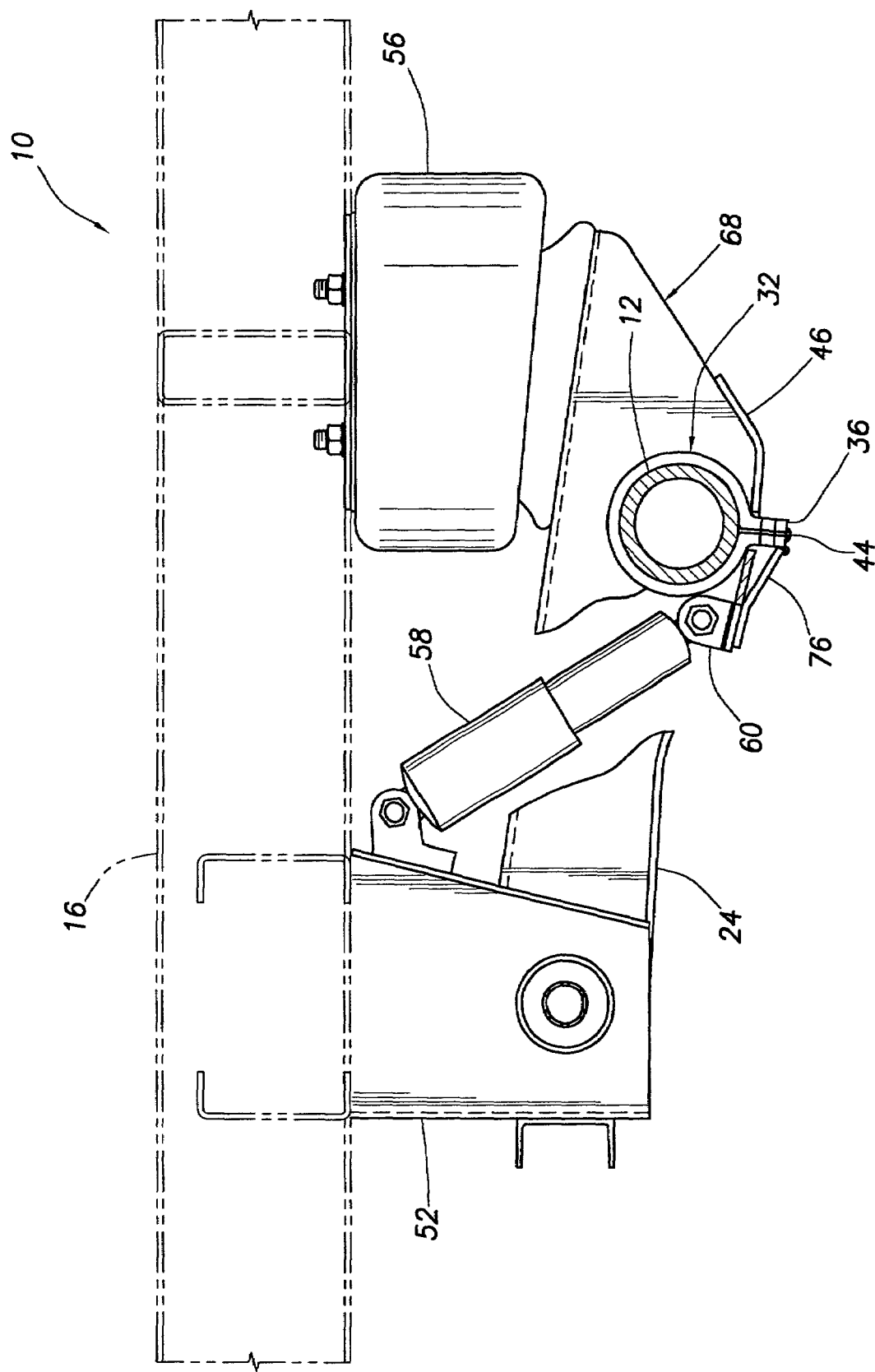
FIG. 9 is a side view of a fourth suspension system embodying principles of the present invention.

Referring additionally now to FIG. 9, another alternate construction for the suspension system 10 is representatively illustrated. The shock absorber 58 is interconnected between the hanger bracket 52 and the axle 12 similar to the embodiment depicted in FIG. 6. However, instead of welding the shock mounting bracket 60 directly to a portion 50 of the sleeve 48, the mounting bracket is attached to the sleeve 32 by means of another bracket 76.

The bracket 76 may be welded to the clamp portion 36 of the sleeve 32. If desired, the bracket 76 may also be welded to the arm 68, for example, by welding to the bottom plate 24. In that case, the bracket 76 may also serve to strengthen the attachment between the sleeve 32 and the arm 68.

Figure 10:
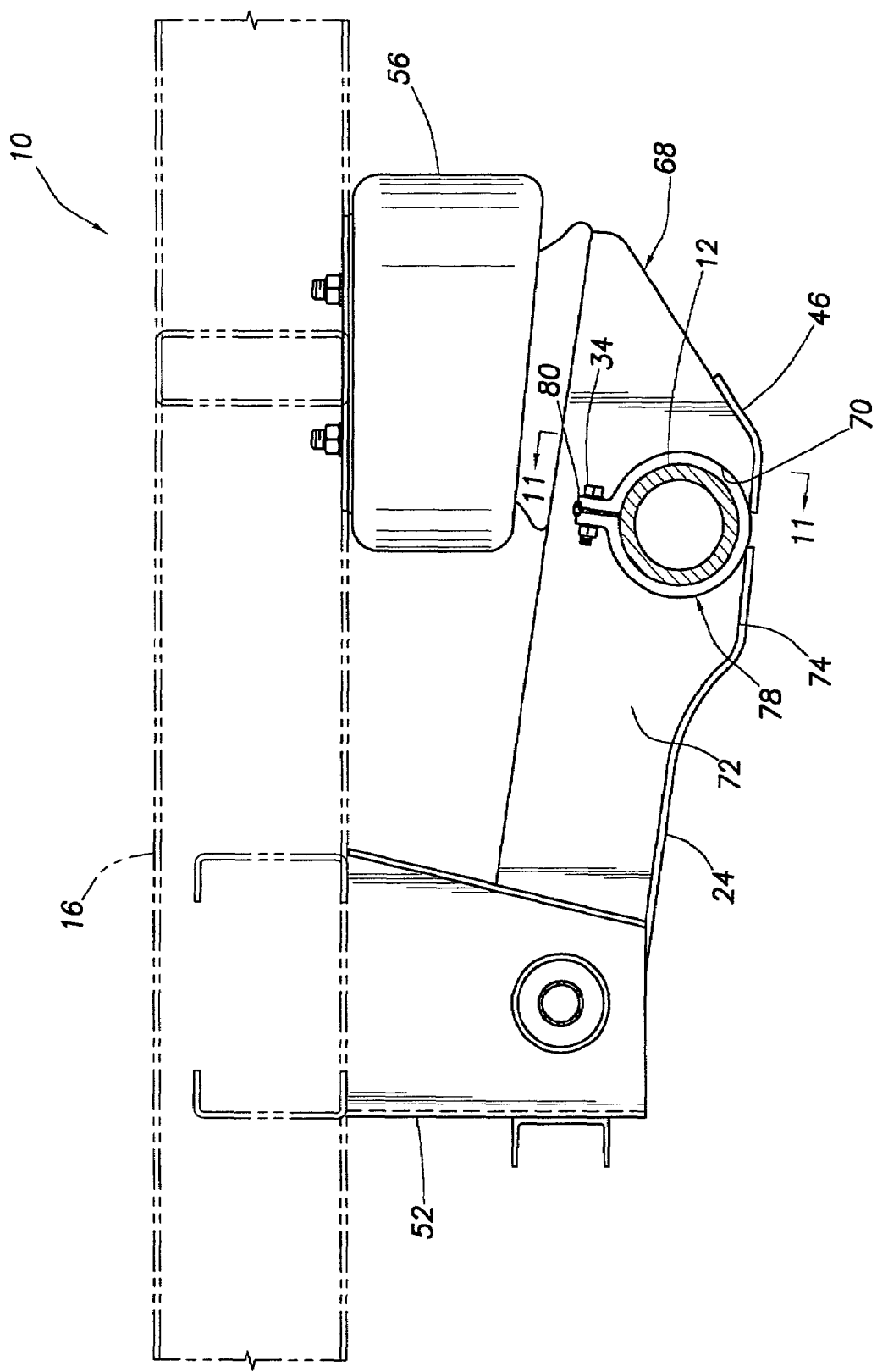
FIG. 10 is a side view of a fifth suspension system embodying principles of the present invention.

Referring additionally now to FIG. 10, another alternate construction of the suspension system 10 is representatively illustrated. In this embodiment, a sleeve 78 is used which includes a specially adapted clamp portion 80. The clamp portion 80 permits the sleeve 78 to rotate within the openings 70 after being inserted therein.

Figure 11:
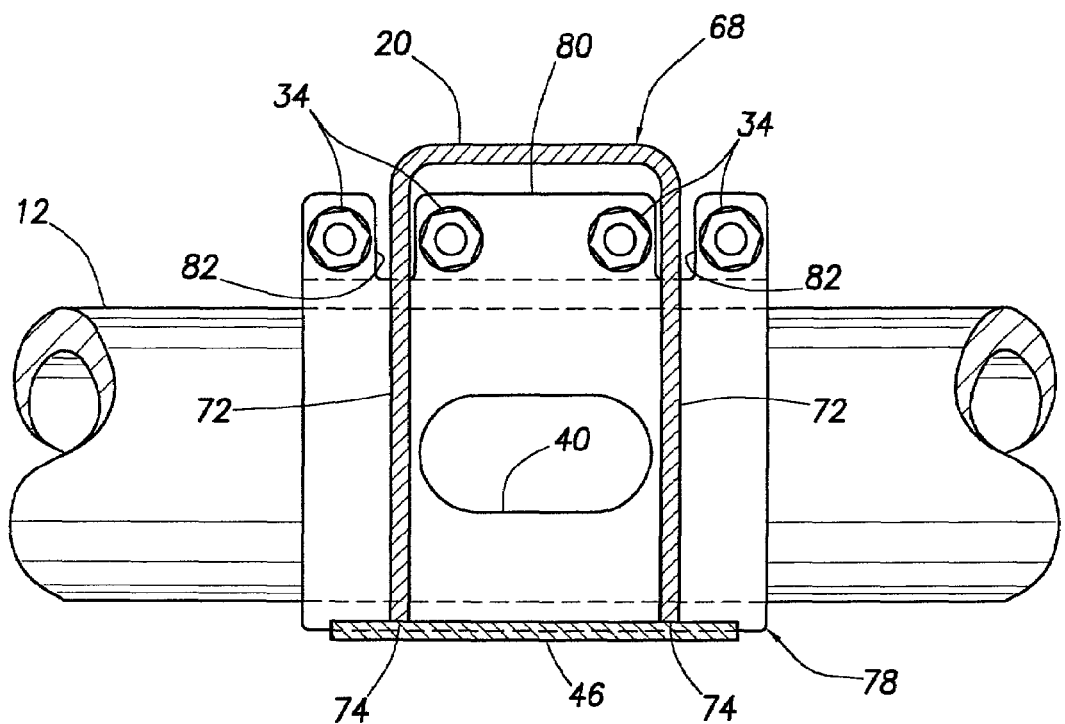
FIG. 11 is a cross-sectional view of the fifth suspension system, taken along line 11—11 of FIG. 10.

The clamp portion 80 may be more clearly seen in the cross-sectional view depicted in FIG. 11. In this view, it may be seen that the clamp portion 80 includes two recesses 82 aligned with the side walls 72 of the arm 68. The recesses 82 permit the sleeve 78 to rotate within the openings 70 in the side walls 72.

When the sleeve 78 is inserted into the openings 70, the clamp portion 80 is positioned so that it extends downwardly as viewed in FIG. 10, so that the clamp portion passes through the voids between the openings and the lower edges 74 of the side walls 72. The recesses 82 are then aligned with the side walls 72 and the sleeve 78 is rotated until the clamp portion 80 extends upwardly. The sleeve 78 is welded to the arm 68 with the clamp portion 80 in its upward position. This upward positioning of the clamp portion 80 increases the ground clearance of the suspension system 10.

Note that the bottom plates 24, 46 may be welded to the side walls 72 after the sleeve 78 and side walls 72 are welded together, in order to provide access to the sleeve between the side walls. The bottom plates 24, 46 may also be welded to the sleeve 78. The fasteners 34 may be removed, or they may remain in the clamp portion 80. The clamp portion 80 may be welded together as described above, whether or not the fasteners 34 are removed.

Figure 12:
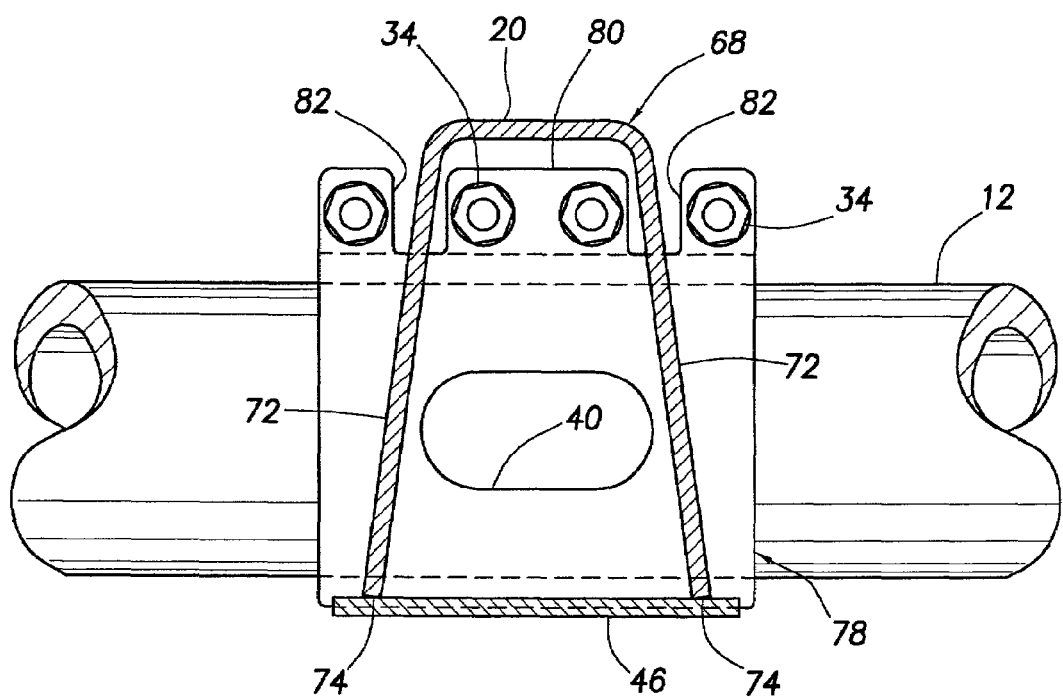
FIG. 12 is a cross-sectional view of the fifth suspension system, showing an alternate configuration thereof.

The side walls 72 of the arm 68 are parallel to each other as depicted in FIG. 11. However, it is not necessary for the side walls 72 to be parallel to each other. In FIG. 12, the arm 68 is depicted with an alternate construction in which the side walls 72 are each inclined inwardly toward the top plate 20, and inclined outwardly toward the bottom plate 46.

Note that the recesses 82 of the clamp portion 80 as depicted in FIG. 12 have been widened (as compared to the clamp portion 80 as depicted in FIG. 11) to accommodate the inclined side walls 72.

Figure 13:
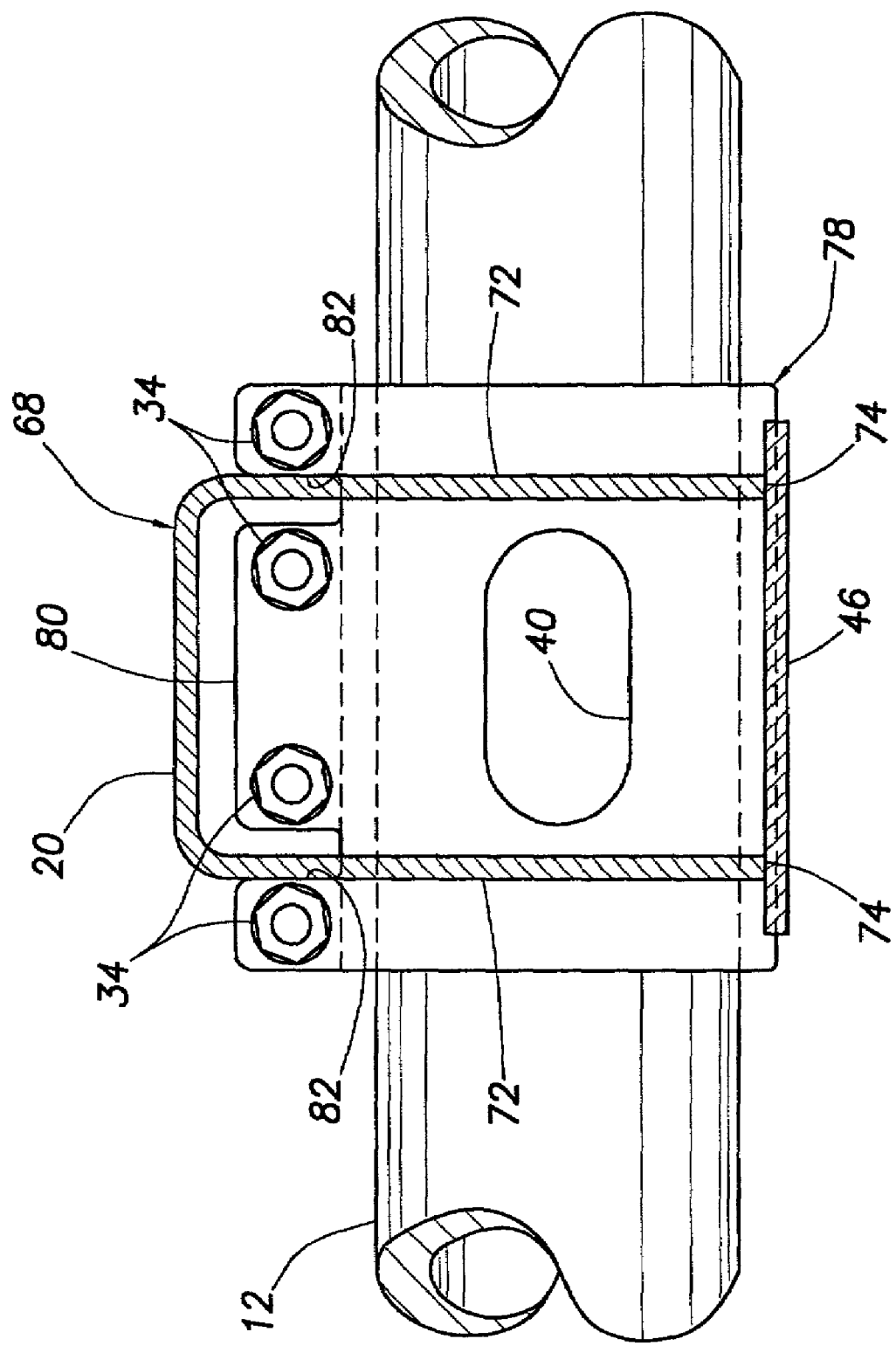
FIG. 13 is a cross-sectional view of the fifth suspension system, showing another alternate configuration thereof.

In FIG. 13 is depicted another alternate construction of the arm 68 in which the side walls 72 are parallel to each other. This alternate construction differs from that shown in FIG. 11 in that the side walls 72 are sufficiently close to, or in contact with, the recesses 82 so that the clamp portion 80 may be welded to the side walls at the recesses, thereby further strengthening the connection between the sleeve 78 and the arm 68.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A vehicle suspension system, comprising:
    an axle;
    a sleeve clamped on the axle in a clamped position without press-fitting, the sleeve being welded in the clamped position; and
    an arm attached to the axle by welding directly to the sleeve, the sleeve being welded to the arm at openings formed through opposing side walls of the arm, and the openings in the side walls extending less than 360 degrees about the sleeve.

2. The suspension system according to claim 1, wherein each of the side walls includes a void extending between the respective side wall opening and a peripheral edge of the side wall, and wherein a clamp portion of the sleeve is received in each of the voids.

3. The suspension system according to claim 2, wherein the arm includes at least one plate welded to and extending between each of the side walls, wherein the clamp portion extends outwardly from the void in each side wall, and wherein the plate is welded to the clamp portion extending outwardly from the void in each side wall.

4. The suspension system according to claim 1, further comprising a shock absorber attached to the sleeve.

5. The suspension system according to claim 4, wherein the shock absorber is attached to the sleeve via a bracket welded directly to the sleeve.

6. The suspension system according to claim 4, wherein the bracket is welded to the sleeve without also being welded to the arm.

7. The suspension system according to claim 1, wherein the sleeve extends greater than 180 degrees about the axle.

8. A vehicle suspension system, comprising:
an axle;
a sleeve clamped on the axle in a clamped position without press-fitting, the sleeve being welded in the clamped position; and
an arm attached to the axle by welding directly to the sleeve, the arm including a generally U-shaped portion having opposing side walls, and a plate extending between the side walls and welded to each of the side walls, the plate further being welded to the sleeve.

9. The suspension system according to claim 8, wherein the sleeve includes a generally radially outwardly extending clamp portion, and wherein the plate is welded to the clamp portion.

10. A vehicle suspension system, comprising:
an axle;
a sleeve clamped on the axle in a clamped position without press-fitting, the sleeve being welded in the clamped position; and
an arm attached to the axle by welding directly to the sleeve, the sleeve being welded in its clamped position by a weld extending between structural members of a generally radially outwardly extending clamp portion of the sleeve.

11. A vehicle suspension system, comprising:
an axle;
a sleeve clamped on the axle in a clamped position without press-fitting, the sleeve being welded in the clamped position; and
an arm attached to the axle by welding directly to the sleeve, the sleeve being welded to the axle in at least one opening formed laterally through the sleeve.

12. A vehicle suspension system, comprising:
an axle;
a sleeve clamped on the axle in a clamped position without press-fitting, the sleeve being welded in the clamped position; and
an arm attached to the axle by welding directly to the sleeve, the sleeve being welded to the arm at openings formed through opposing side walls of the arm, and the side walls being welded to the sleeve less than 360 degrees about the sleeve.

13. A vehicle suspension system, comprising:
an axle;
a sleeve clamped to the axle without press-fitting; and
an arm having opposing side walls, each of the side walls having an opening formed therethrough, the sleeve being received in each of the openings, and the sleeve being welded to the arm less than 360 degrees about a periphery of each of the openings.

14. The suspension system according to claim 13, wherein the sleeve is clamped to the axle in a manner producing a compressive stress between the sleeve and the axle.

15. The suspension system according to claim 14, further comprising at least one fastener in a clamp portion of the sleeve, the compressive stress being produced when the fastener is tightened.

16. The suspension system according to claim 15, wherein the clamp portion extends in a void formed in each of the side walls between the respective opening and a peripheral edge of the side wall.

17. The suspension system according to claim 16, wherein the arm further includes at least one plate attached to and extending between the side walls, the plate being welded to the sleeve.

18. The suspension system according to claim 17, wherein the plate is welded to the clamp portion of the sleeve.

19. The suspension system according to claim 18, wherein the clamp portion extends outwardly from the void in each side wall, and wherein the plate is welded to the clamp portion extending outwardly from the void in each side wall.

20. The suspension system according to claim 13, wherein the sleeve extends greater than 180 degrees about the axle.

21. A method of fabricating a vehicle suspension system, the method comprising the steps of:
clamping a sleeve to an axle without press-fitting;
welding the sleeve, thereby retaining the sleeve in its clamped position; and
welding the sleeve to each of opposing side walls of an arm, the sleeve being welded less than 360 degrees about an opening formed through each of the side walls.

22. The method according to claim 21, wherein the step of welding the sleeve in its clamped position further comprises welding together members of a clamp portion of the sleeve.

23. The method according to claim 22, further comprising the step of welding the plate to the side walls after the step of welding the sleeve to the side walls.

24. The method according to claim 23, further comprising the step of welding the plate to the side walls prior to the step of welding the sleeve to the side walls.

25. The method according to claim 23, further comprising the step of welding the plate to the side walls prior to the step of welding the sleeve to the side walls.

26. The method according to claim 21, wherein the clamping step further comprises tightening at least one fastener in a clamp portion of the sleeve.

27. The method according to claim 26, further comprising the step of removing the fastener from the clamp portion after the step of welding the sleeve in its clamped position and prior to the step of welding the sleeve to the side walls.

28. The method according to claim 21, wherein in the clamping step, the sleeve extends greater than 180 degrees about the axle.

29. A method of fabricating a vehicle suspension system, the method comprising the steps of:
clamping a sleeve to an axle without press-fitting, thereby removing clearance between the sleeve and axle, and applying a compressive stress between the sleeve and axle;
welding the sleeve to the axle;
welding opposing side walls of an arm to the sleeve; and
welding a plate to the sleeve, the plate extending between the side walls.

30. The method according to claim 29, further comprising the step of retaining the compressive stress between the sleeve and axle by welding together members of the sleeve.

31. The method according to claim 30, wherein in the retaining step the sleeve members are included in a clamp portion of the sleeve.

32. The method according to claim 31, wherein the step of welding the side walls to the sleeve further comprises welding the side walls to the clamp portion of the sleeve.

33. The method according to claim 31, wherein in the step of welding the side walls to the sleeve, the clamp portion is positioned at least partially between the side walls.

34. The method according to claim 29, further comprising the step of welding a shock absorber mounting bracket to the sleeve, without welding the mounting bracket to the arm.

35. The method according to claim 29, wherein the step of welding the plate to the sleeve further comprises welding the plate to a clamp portion of the sleeve.

36. The method according to claim 29, further comprising the step of welding the plate to each of the side walls prior to the step of welding the plate to the sleeve.

37. The method according to claim 29, further comprising the step of welding the plate to each of the side walls after the step of welding the plate to the sleeve.

38. The method according to claim 29, wherein in the clamping step, the sleeve extends greater than 180 degrees about the axle.

39. A method of fabricating a vehicle suspension system, the method comprising the steps of:
   clamping a sleeve to an axle without press-fitting, thereby removing clearance between the sleeve and axle, and applying a compressive stress between the sleeve and axle;
   retaining the compressive stress between the sleeve and axle by welding together members of the sleeve, the sleeve members being included in a clamp portion of the sleeve;
   welding the sleeve to the axle; and
   welding opposing side walls of an arm to the sleeve,
   wherein the clamping step further comprises tightening a fastener in the members of the clamp portion.

40. A method of fabricating a vehicle suspension system, the method comprising the steps of:
   clamping a sleeve to an axle without press-fitting, thereby removing clearance between the sleeve and axle, and applying a compressive stress between the sleeve and axle;
   retaining the compressive stress between the sleeve and axle by welding together members of the sleeve, the sleeve members being included in a clamp portion of the sleeve;
   welding the sleeve to the axle; and
   welding opposing side walls of an arm to the sleeve, the clamp portion extending in a void formed between a respective opening and a peripheral edge of each side wall.

41. The method according to claim 40, wherein in the step of welding the side walls to the sleeve, the clamp portion extends outwardly beyond the side wall peripheral edges.

42. A vehicle suspension system, comprising:
   an axle;
   a sleeve clamped in a clamped position on the axle by a clamp portion of the sleeve, the sleeve being welded in the clamped position prior to the sleeve being welded to the axle; and
   an arm attached to the axle by welding to the sleeve, the sleeve being welded to the arm at openings formed through opposing side walls of the arm, and the side walls being welded to the sleeve less than 360 degrees about the sleeve.

43. The suspension system according to claim 42, wherein the sleeve is welded in its clamped position by a weld extending between structural members of the clamp portion of the sleeve.

44. The suspension system according to claim 42, further comprising a shock absorber attached to the sleeve.

45. The suspension system according to claim 44, wherein the shock absorber is attached to the sleeve via a bracket welded directly to the sleeve.

46. The suspension system according to claim 44, wherein the bracket is welded to the sleeve without also being welded to the arm.

47. The suspension system according to claim 42, wherein the sleeve extends greater than 180 degrees about the axle.

48. A vehicle suspension system, comprising:
   an axle;
   a sleeve clamped in a clamped position on the axle by a clamp portion of the sleeve, the sleeve being welded in the clamped position prior to the sleeve being welded to the axle; and
   an arm attached to the axle by welding to the sleeve, the arm including a generally U-shaped portion having opposing side walls, and a plate extending between the side walls and welded to each of the side walls, the plate further being welded to the sleeve.

49. The suspension system according to claim 48, wherein the plate is welded to the clamp portion of the sleeve.

50. A vehicle suspension system, comprising:
   an axle;
   a sleeve clamped in a clamped position on the axle by a clamp portion of the sleeve, the sleeve being welded in the clamped position prior to the sleeve being welded to the axle, and the sleeve being welded to the axle in at least one opening formed laterally through the sleeve; and
   an arm attached to the axle by welding to the sleeve.

51. A vehicle suspension system, comprising:
   an axle;
   a sleeve clamped in a clamped position on the axle by a clamp portion of the sleeve, the sleeve being welded in the clamped position prior to the sleeve being welded to the axle; and
   an arm attached to the axle by welding to the sleeve, the sleeve being welded to the arm at openings formed through opposing side walls of the arm, and the openings in the side walls extending less than 360 degrees about the sleeve.

52. The suspension system according to claim 51, wherein each of the side walls includes a void extending between the respective side wall opening and a peripheral edge of the side wall, and wherein the clamp portion of the sleeve is received in each of the voids.

53. The suspension system according to claim 52, wherein the arm includes at least one plate welded to and extending between each of the side walls, and wherein the plate is welded to the clamp portion extending outwardly from the void in each side wall.

54. A method of fabricating a vehicle suspension system, the method comprising the steps of:
   clamping a sleeve to an axle, thereby removing clearance between the sleeve and axle, and applying a compressive stress between the sleeve and axle;
   then welding the sleeve to the axle; and
   then welding opposing side walls of an arm to the sleeve.

55. The method according to claim 54, further comprising the step of retaining the compressive stress between the sleeve and axle by welding together members of the sleeve.

56. The method according to claim 55, wherein the step of retaining the compressive stress is performed prior to the step of welding the sleeve to the axle.

57. The method according to claim 55, wherein in the step of retaining the compressive stress between the sleeve and axle, the members of the sleeve are included in a clamp portion of the sleeve.

58. The method according to claim 57, wherein the clamping step further comprises tightening a fastener in the members of the clamp portion.

59. The method according to claim 57, wherein the step of welding the side walls to the sleeve further comprises welding the side walls to the clamp portion of the sleeve.

60. The method according to claim 57, wherein in the step of welding the side walls to the sleeve, the clamp portion is positioned at least partially between the side walls.

61. The method according to claim 57, wherein in the step of welding the side walls to the sleeve, the clamp portion extends in a void formed between a respective opening and a peripheral edge of each side wall.

62. The method according to claim 61, wherein in the step of welding the side walls to the sleeve, the clamp portion extends outwardly beyond the side wall peripheral edges.

63. The method according to claim 54, further comprising the step of welding a shock absorber mounting bracket to the sleeve, without welding the mounting bracket to the arm.

64. The method according to claim 54, further comprising the step of welding a plate to the sleeve, the plate extending between the side walls.

65. The method according to claim 64 wherein the step of welding the plate to the sleeve further comprises welding the plate to a clamp portion of the sleeve.

66. The method according to claim 64, further comprising the step of welding the plate to each of the side walls prior to the step of welding the plate to the sleeve.

67. The method according to claim 64, further comprising the step of welding the plate to each of the side walls after the step of welding the plate to the sleeve.

68. The method according to claim 54, wherein in the clamping step, the sleeve extends greater than 180 degrees about the axle.

69. The method according to claim 54, wherein the step of clamping the sleeve to the axle is performed without press-fitting the sleeve onto the axle.

* * * * *